United States Patent [19]

Yagi

[11] Patent Number: 4,811,101

[45] Date of Patent: Mar. 7, 1989

[54] BLACK LEVEL CORRECTION CIRCUIT FOR CORRECTING BLACK LEVEL OF A VIDEO SIGNAL

[75] Inventor: Yasuo Yagi, Ohta, Japan

[73] Assignee: Pioneer Electronic Corporation, Tokyo, Japan

[21] Appl. No.: 194,188

[22] Filed: May 16, 1988

[30] Foreign Application Priority Data

Jun. 26, 1987 [JP] Japan .......................... 62-098306[U]

[51] Int. Cl.$^4$ .............................................. H04N 5/16
[52] U.S. Cl. ..................................... 358/171; 358/34; 358/172
[58] Field of Search ................. 358/170, 171, 172, 33, 358/34, 39

[56] References Cited

U.S. PATENT DOCUMENTS

| 2,301,522 | 11/1942 | Cawein | 358/171 X |
| 3,309,462 | 3/1967 | Loughlin | 358/171 X |
| 3,927,255 | 12/1975 | Yorkanis | 358/172 |
| 3,959,811 | 5/1976 | Shanley, II | 358/34 X |
| 4,110,790 | 8/1978 | Wheeler | 358/172 X |
| 4,631,589 | 12/1986 | Hongu et al. | 358/171 |
| 4,660,084 | 4/1987 | Fillman et al. | 358/172 X |
| 4,660,085 | 4/1987 | Harwood et al. | 358/172 X |
| 4,730,210 | 3/1988 | Leshko | 358/34 |

FOREIGN PATENT DOCUMENTS

| 2843045 | 4/1979 | Fed. Rep. of Germany | 358/172 |
| 57-203375 | 12/1982 | Japan | 358/172 |

Primary Examiner—James J. Groody
Assistant Examiner—E. Anne Faris
Attorney, Agent, or Firm—Foley & Lardner, Schwartz, Jeffery, Schwaab, Mack, Blumenthal & Evans

[57] ABSTRACT

A black level correction circuit includes an extraction circuit for extracting a black signal from a video signal as a signal whose level is lower than a reference level, and a black level expanding circuit for expanding in level of the black signal for that peak level of the black signal equals a normal black level. The circuit further includes a level adjusting circuit which adjusts the reference level for extracting the black signal on the basis of at least one of an average value of a luminance signal portion the video signal, and a beam current value of a cathode-ray tube to which the video signal is supplied. With the variable reference level, contrast is improved for pictures having high luminance levels or low luminance levels on the whole.

4 Claims, 3 Drawing Sheets

BLACK LEVEL CORRECTION CIRCUIT FOR CORRECTING BLACK LEVEL OF A VIDEO SIGNAL

BACKGROUND OF THE INVENTION

1. Field of the Invention

The present invention relates to a black level correction circuit for a television receiver or a television monitor.

2. Description of Background Information

An example of conventional black level correction circuit is explained with reference to FIG. I of the accompanying drawings.

In FIG. 1, an input terminal 1 receives a video signal which is demodulated by an RF tuner (not shown). This video signal is supplied to a clamp capacitor 2 and, through a node 3, to a level shift circuit 4 operating as an adder. An output signal of the level shift circuit 4 is supplied, through an amplifier 5, to a ORT section (not shown) including an RGB processing circuit and so on, and also to a switch circuit 6 and a clamp circuit 7. An output signal of the clamp circuit 7 is fed back to the node 8 through a switch circuit 8 to which a clamp pulse signal is supplied. The clamp circuit 7 and the switch circuit 8 together operate to adjust the pedestal level of the video signal to a normal level in such a manner as so compare the output signal of the level shift circuit 4 with a reference voltage Vc corresponding to the pedestal level during the presence of the clamp pulse signal which is supplied when the video signal is at its pedestal section, and to charge the clamp capacitor 2 (to supply electric charge to the clamp capacitor) in order that the output signal of the level shift circuit 4 is controlled at the pedestal level.

Blanking pulses are supplied to the switch circuit 6, so that it is opened during the period of sections of the video signal other than the luminance information section, such as the sync pulse section, so that only the luminance information of the video signal is supplied to a black peak detector circuit 9.

The black level detector circuit 9 compares the level of the supplied video signal with a level held by a black peak hold circuit 10, and supplies the video signal to the black peak hold circuit 10 when the level of the video signal is more closer to a maximum black level than to the held level. The black peak hold circuit 10 is made up of a capacitor and its charge and discharge circuit, and holds the supplied black peak voltage, and also changes the hold level gradually toward the white level in order to hold a new black peak level in response to changes in the picture information. This black peak level is supplied to a level comparator circuit 11. The level comparator circuit 11 compares the hold level with the maximum black level $V_B$ and supplies a difference signal between them to a voltage controlled variable gain amplifier (referred to simply as VOA hereinafter) 12 which is made up of a transistor-differential amplifier.

When the black peak level is at the maximum black level, the input signal of the VCA 12 becomes equal to 0, and VCA 12 produces no output signal. At a gain control input terminal of the VCA 12 there is supplied an output signal of a black detection circuit 13. Output signal of the VOA 12 is supplied to the level shift circuit 4 through a switch 15 which opens in response to blanking pulses, so as to transmit the signal only in the section of luminance signal. Thus, the output signal of the VCA 12 is superimposed on the output signal of the level shift circuit 4.

The video signal at the node 3 is supplied to the black detection circuit 13 through a switch circuit 16 which transmits only the luminance signal sections of the video signal in response to the blanking signal. The black detection circuit 13 detects portion(s) of the video signal whose level is lower than a predetermined threshold level $V_{TH}$ as a black signal, and supplies the level of the black signal exceeding the threshold level $V_{TH}$ (in the black direction) to the VOA 12 as its gain control signal. The gain of the VOA 12 is raised as the amplitude of the black signal increases.

With the above explained arrangement, when a black peak value of the video signal which exceeds the threshold level $V_{TH}$ is supplied to the terminal I, then it is compared with a previously held value by means of the black peak hold circuit 10. If the black level of the present time is higher than the previously held value, the held value of the black peak hold circuit is renewed, and the new held value is supplied to a VCA 14 through a level comparator circuit 13.

The output signal of the VCA 12 is superimposed on the black peaks of the video signal by means of the level shift circuit 4, and the peak value is further expanded toward the maximum black level. This operation of expanding the black level is a feedback control by which the peak level of the expanded black signal is controlled to be equal to the maximum black level $V_B$. In addition, the black peak level being held varies gradually in the white direction as a result of discharging, as mentioned before. Therefore, as illustrated in FIG. 8 (A), the black peak of the video signal exceeding the threshold level $V_{TH}$ in the black direction is expanded toward the normal maximum black level, so that a black-corrected video signal is obtained and which in turn will be reproduced by a television receiver or a television monitor (not shown).

As shown in FIG. 8 (B), the video signal exceeding the threshold level $V_{TH}$ is transferred to the black-corrected video signal which is expanded in the black direction on the basis of its black peak level, at the VOA 12. Thus, there is an advantage that the reproduction of black in the television receiver and the like is improved.

On the other hand, if a video signal of entirely low luminance level, such as a scene of the sea, is supplied to this black level correction circuit, then the video signal will be expanded in the black direction entirely, because it stays below the threshold level. Therefore, it is undesirable that the reproduced picture looks too dark, or in other words, what is called a dark-saturation occurs. Furthermore, it is desired that the black level correction circuit is also effective for an entirely bright video signal which has little portion exceeding the threshold level $V_{TH}$ so that the contrast (contrast ratio) of the video signal is improved.

OBJECT AND SUMMARY OF THE INVENTION

An object of the present invention is therefore to provide a black level correction circuit in which the operation of the black level correction can be adjusted in response to the content of the picture information.

In order to accomplish the above object, a black level correction circuit according to the present invention including an extraction circuit for extracting, from an input video signal, a black signal whose level is lower than a reference level, and a black level expanding circuit for expanding in level the black signal and for expanding the black signal so that a peak level of the black signal equals a normal black level, is characterized by the provision of a level adjusting circuit for adjusting the said reference level on the basis of at least one of an average value of the video signal for its luminance information section and a beam current value of a cathode-ray tube for displaying the picture.

DETAILED DESCRIPTION OF A PREFERRED EMBODIMENT

Figure 1:
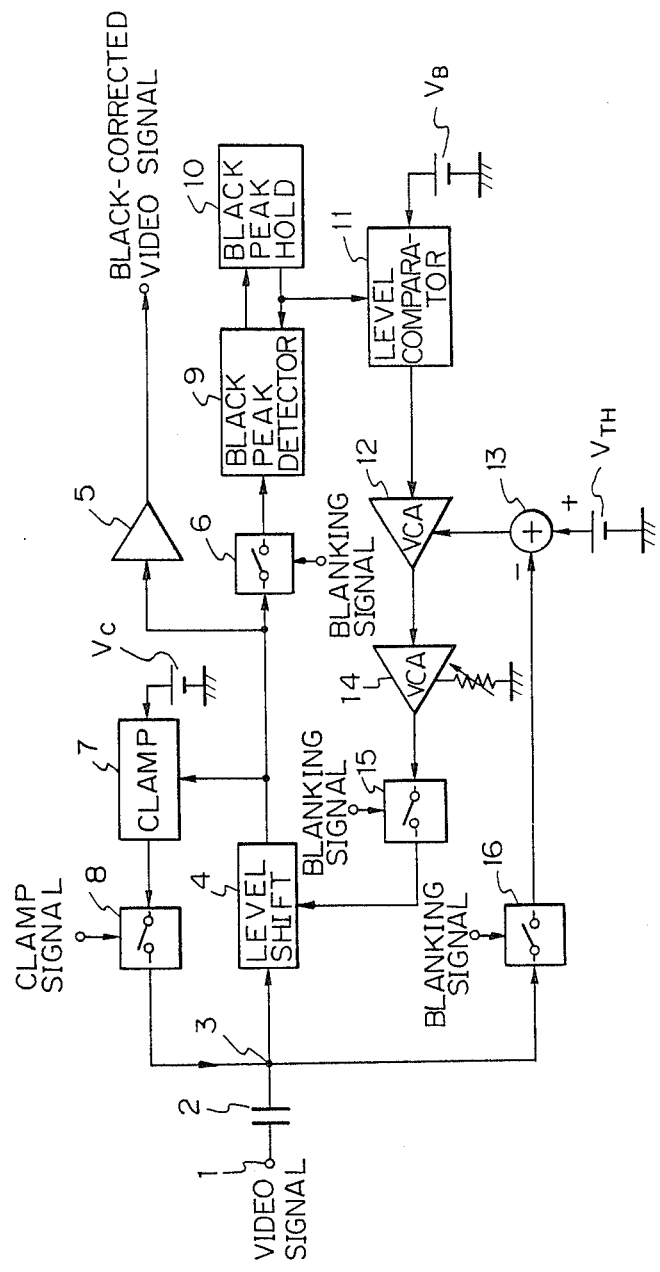
FIG. 1 is a block diagram showing a conventional black level correction circuit.

An embodiment of the black level correction circuit according to the present invention will be explained with reference to FIG. 2 of the accompanying drawings. In the block diagrams of FIGS. 1 and 2, like reference numerals denote like parts or corresponding elements of the circuit, and the explanation of those parts will not be repeated.

Figure 2:
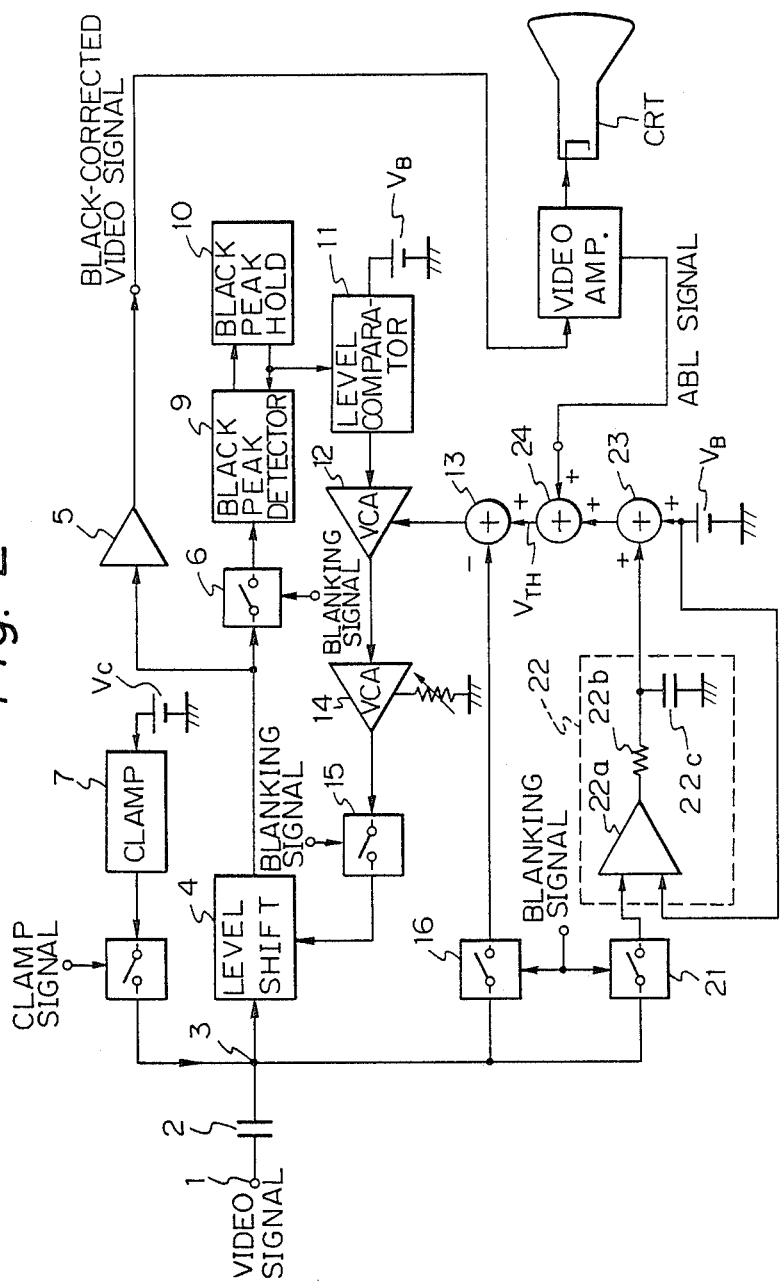
FIG. 2 is a block diagram showing an embodiment of a black level correction circuit according to the present invention.
Figure 3:
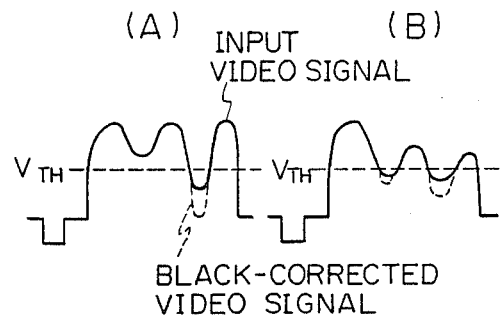
FIGS. 3 and 4 are waveform diagrams showing the operation of the conventional black level correction circuit shown in FIG. 1.

As shown in FIG. 2, the video signal is supplied to an average luminance level detection circuit 22 through the clamp capacitor 2 and a switch 21. The switch 21 is 16 supplied with the blanking signal, and transmits only luminance signal sections of the video signal to the average luminance level detection circuit 22. The average luminance level detection circuit 22 is made up of a differential amplifier 22a having input terminals one of which receives the maximum black level, and a low pass filter which is made up of a resistor 22b and a capacitor 22c. With this construction, an output signal indicating an average value of the video signal without including portions corresponding to the blanking period and portions whose level is lower than the maximum black level (simply referred to as APL signal hereinafter) is obtained. This average value is a value in a section of the video signal corresponding to one horizontal scanning period. However, an average value of the video signal for a period corresponding to one entire picture may also be used. The APL signal is supplied to an adder 28 in which the APL signal is added to a reference level such as the maximum black level or the pedestal level. An output signal of the adder 28 is supplied to an adder 24, in which the output signal of the adder is added to the level of a signal corresponding to the beam current of the cathode-ray tube for displaying pictures, such as the automatic beam limit signal (simply referred to as ABL signal hereinafter) which is well known as a signal for improving the problem generated when an excessive beam current is supplied to the cathode-ray tube for displaying pictures. Accordingly, a signal obtained by the superimposition of the reference voltage, the APL signal, and the ABL signal is generated at an output of the adder 24, and supplied to the black detection circuit 13 as the threshold level $V_{TH}$ for detecting the black signal. Since other parts of the construction is the same as the corresponding parts of the circuit shown in FIG. 1, the explanation will not be repeated.

Figure 4:
Figure 5:
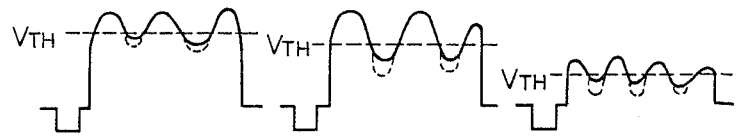
FIG. 5 is a waveform diagram showing the operation of the black level correction circuit according to the present invention.

The operation of the above circuit will be explained with reference to FIG. 5 of the accompanying drawings. At first, when the luminance level of the video signal is high on the whole, the level of the APL signal goes high, to raise the threshold level $V_{TH}$ for detecting the black signal as illustrated in FIG. 5 (A). Therefore, the portion expanded in the black direction is enlarged in amplitude according the black peak hold level held in the black peak hold circuit 10. When the threshold level $V_{TH}$ is at the same level as the conventional circuit as shown in FIG. 5 (B), the operation of this circuit is the same as the conventional circuit. On the other hand, when the luminance level is low on the whole, the level of the APL signal goes down as shown in FIG. 5 (0), to reduce the threshold level $V_{TH}$. Therefore, the portion expanded in the black direction becomes smaller than the state illustrated in FIG. 4.

As explained in the above, with the circuit according to the present invention has an advantage that the contrast is improved for pictures of high luminance level on the whole, and also the "black saturation" is suppressed pictures of low luminance level on the whole, so that the contrast is improved also for such pictures.

In addition, there is a tendency that the picture displayed on a cathode-ray tube becomes whitish, to reduce the contrast of the picture when the luminance level is high. According to the present invention, the threshold level is raised in response to the generation of the ABL signal as a result of the increase in the beam current of the cathode-ray tube, so that the circuit operates to raise the contrast of the picture.

Furthermore, since peak values to be selected as a black peak expanded to the maximum black level are also varied in accordance with the change in the threshold level $V_{TH}$, there also is an effect of raising the contrast ratio in response to the peak values.

If the maximum black level of a broadcasting signal is below the pedestal level due to the setting in a broadcssting station for example, the above mentioned maximum black level may be set below the pedestal level correspondingly.

As explained in detail so far, the black level correction circuit according to the present invention is characterized, in the construction for improving the reproduction of black by expanding portions of a video signal exceeding a threshold level in the black direction, that the threshold level is continuously varied in response to the APL signal, the ABL signal and the like.

Therefore, it is advantageous that the contrast in the reproduced image of a picture having high luminance levels on the whole or low luminance levels on the Whole is much improved.

While the invention has been particularly shown and described with reference to a preferred embodiment thereof, it Will be understood by those skilled in the art that the invention may be practiced otherwise than as specifically described within the scope of the appended claims.

What is claimed is:

1. A black level correction circuit for correcting an input video signal to be supplied to a cathode-ray tube, comprising:
an extraction circuit means for extracting, from said input video signal, a black signal whose level is lower than a reference level;

a black level expanding circuit means for expanding in amplitude said black signal to an extent that a peak value of said black signal equals a normal black level; and a level adjusting circuit means for varying said reference level on the basis of at least one of an average value of a luminance information section of said input video signal and a beam-current value of said cathode-ray tube.

2. A Black level correction circuit as set forth in claim 1, wherein said level adjusting circuit means includes an average luminance value detection circuit means for detecting an average luminance value by using sections of said video signal whose level is higher than a maximum black level.

3. A black level correction circuit for correcting an input video signal, comprising:

an extraction circuit means for extracting, from said input video signal, a black signal whose level is lower than a reference level;

a black level expanding circuit means for expanding in amplitude said black signal to an extent that a peak value of said black signal equals a normal black level; and a level adjusting circuit means for varying said reference level on the basis of an average value of a luminance information section of said input video signal.

4. A Black level correction circuit as set forth in claim 8, wherein said level adjusting circuit means includes an average luminance value detection circuit means for detecting an average luminance value by using sections of said video signal whose level is higher than a maximum black level.

* * * * *